(12) United States Patent
Thörnblom et al.

(10) Patent No.: US 11,586,717 B2
(45) Date of Patent: Feb. 21, 2023

(54) METHOD AND ELECTRONIC DEVICE FOR AUTHENTICATING A USER (71) Applicant: FINGERPRINT CARDS AB, Gothenburg (SE)

(72) Inventors: Hans Thörnblom, Kungsbacka (SE); Eric Setterberg, Västra Frölunda (SE); Lars Puggaard Bøgild Christensen, Charlottenlund (DK); Søren Skovgaard Christensen, Dyssegaard (DK); Anders Ø. Nielsen, Frederiksberg (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 280 days.

(21) Appl. No.: 16/613,326

(22) PCT Filed: May 23, 2018

(86) PCT No.: PCT/SE2018/050521
§ 371 (c)(1),
(2) Date: Nov. 13, 2019

(87) PCT Pub. No.: WO2018/217157
PCT Pub. Date: Nov. 29, 2018

(65) Prior Publication Data
US 2020/0184056 A1 Jun. 11, 2020

(30) Foreign Application Priority Data
May 23, 2017 (SE) .................................... 1750644-5

(51) Int. Cl.
G06F 21/32 (2013.01)
G06F 21/34 (2013.01)
(Continued)

(52) U.S. Cl.
CPC .............. *G06F 21/32* (2013.01); *G06F 21/34* (2013.01); *G06F 21/602* (2013.01);
(Continued)

(58) Field of Classification Search
CPC ........ G06F 21/32; G06F 21/34; G06F 21/602; G06K 9/00087; G06K 9/00986; G06K 9/00006; H04L 9/0866
(Continued)

(56) References Cited

U.S. PATENT DOCUMENTS

| 4,135,147 A | * | 1/1979 | Riganati | ............ G06K 9/00006 382/125 |
| 9,536,131 B1 | | 1/2017 | Chiang et al. | |

(Continued)

FOREIGN PATENT DOCUMENTS

| EP | 3133528 A1 | 2/2017 |
| WO | 2013173838 A2 | 11/2013 |
| WO | 2016200523 A1 | 12/2016 |

OTHER PUBLICATIONS

PCT International Search Report and Written Opinion dated Sep. 10, 2018 for International Application No. PCT/SE2018/050521, 16 pages.

(Continued)

*Primary Examiner* — Jacob Lipman
(74) *Attorney, Agent, or Firm* — RMCK Law Group, PLC (57) ABSTRACT The present disclosure generally relates to a method for authenticating a user using an electronic device, where the electronic device comprises a fingerprint sensor as well as a first and a second control unit. Preferably, the first control unit comprises a secure element and/or a secure block adapted to provide a secure processing environment. The
(Continued)

present disclosure also relates to a corresponding electronic device and to a computer program product.

14 Claims, 4 Drawing Sheets

(51) Int. Cl.
  *G06F 21/60* (2013.01)
  *H04L 9/08* (2006.01)
  *G06V 10/94* (2022.01)
  *G06V 40/12* (2022.01)
(52) U.S. Cl.
  CPC ........ *G06V 10/955* (2022.01); *G06V 40/1365* (2022.01); *H04L 9/0866* (2013.01)
(58) Field of Classification Search
  USPC .......................................... 713/186
  See application file for complete search history.

(56) References Cited

U.S. PATENT DOCUMENTS

| | | | |
|---|---|---|---|
| 2008/0212846 A1* | 9/2008 | Yamamoto | G06F 21/32 |
| | | | 382/115 |
| 2013/0308838 A1 | 11/2013 | Westerman et al. | |
| 2014/0210589 A1 | 7/2014 | Grace | |
| 2016/0070967 A1 | 3/2016 | Du et al. | |
| 2017/0024601 A1 | 1/2017 | Lin | |
| 2017/0041314 A1* | 2/2017 | Shin | G06F 21/32 |
| 2018/0268197 A1* | 9/2018 | Zhang | G06V 10/751 |

OTHER PUBLICATIONS

Extended European Search Report dated Feb. 1, 2021 for EP Application No. 18806401.8, 10 pages.

* cited by examiner

METHOD AND ELECTRONIC DEVICE FOR AUTHENTICATING A USER

CROSS-REFERENCE TO RELATED APPLICATIONS

This application is a 371 U.S. National Stage of International Application No. PCT/SE2018/050521, filed May 23, 2018, which claims priority to Swedish Patent Application No. 1750644-5, filed May 23, 2017. The disclosures of each of the above applications are incorporated herein by reference in their entirety.

TECHNICAL FIELD

The present disclosure generally relates to a method for authenticating a user using an electronic device, where the electronic device comprises a fingerprint sensor as well as a first and a second control unit. Preferably, the first control unit comprises a secure element and/or a secure block adapted to provide a secure processing environment. The present disclosure also relates to a corresponding electronic device and to a computer program product.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic devices, such as smartphones, watches, tablets, or any other type of electronic devices where personalized user interaction is advantageous. There has also been suggested to integrate such a fingerprint sensor with smartcard systems, possibly eliminating the need for the user to input a PIN code when performing e.g. a financial transaction.

However, due to the mobility of the above mentioned electronic devices, there is always a risk that the electronic device falls in the "wrong hands" and/or are presented with e.g. a hacker attack with the purpose of falsify or otherwise affect a biometric identification and/or authentication process.

To counteract such attempts there is a continued attempt to improve the applied biometric identification and/or authentication process. However, such attempts typically result in complex computational processing, thereby increasing the need to equip the electronic equipment with a faster and more computationally strong processing environment.

In some implementations of the above mentioned types of electronic devices, where a high security and computationally strong processing environment is desired, it has been suggested to "split" the computational performance into two parts, the first being a high-performance environment and the second being a high-security environment. The high-performance environment generally has higher computing performance but less security. Correspondingly, the high-security environment, for example comprising a so called secure element, generally has higher security but less computing performance.

An example of such an implementation is disclosed in U.S. Pat. No. 9,536,131. U.S. Pat. No. 9,536,131 provides an interesting approach to dividing the computational resources need for performing fingerprint authentication between a first and a second processing unit, the first processing unit providing the above mentioned high-performance environment and the second processing unit providing the above mentioned high-security environment. In accordance to U.S. Pat. No. 9,536,131, the high-performance first processing unit is used for performing a comparison process between an acquired fingerprint image of a user and a prerecorded fingerprint template for a finger of the user that is to be authenticated.

Unfortunately, the solution presented in U.S. Pat. No. 9,536,131 introduces some possible security risks by means of how the computational processing is divided between the first and the second processing unit.

SUMMARY

In view of above-mentioned problems with prior-art, it is an object of the present disclosure to provide an improved solution where the risks introduced in accordance to some prior-art is reduced. In particular, the present inventors have found that it is unsuitable to perform the matching within an unsecure processing environment, providing a solution that still balances the computational processing in a suitable manner between the high-performance environment and the high-security environment.

According to an aspect of the present disclosure, it is therefore provided a method of authenticating a user using an electronic device, the electronic device comprising a fingerprint sensor configured for capturing a fingerprint representation of a fingerprint pattern of a finger of the user, a first control unit adapted to provide a processing environment having a first security level, and a second control unit adapted to provide a processing environment having a second security level, wherein the first security level is higher than the second security level, wherein the method comprises the steps of acquiring a fingerprint representation using the fingerprint sensor, providing the fingerprint representation to the first control unit, providing the fingerprint representation to the second control unit, determining, using the first control unit, a first set of elements indicative of the fingerprint based on the fingerprint representation, determining, using the second control unit, a second set of elements indicative of the fingerprint based on the fingerprint representation, providing information relating to the second set of elements to the first control unit, and authenticating, at the first control unit, the user based on a first fingerprint template representative for the finger of the user, the first set of elements and the information relating to the second set of elements.

The principal idea behind the present disclosure resides in an improved segmentation of a fingerprint authentication process, where some portions of the fingerprint authentication process is performed by the first control unit and some other portions of the fingerprint authentication process is performed by the second control unit. In accordance to the present disclosure, the first control unit is adapted to have a higher security level than the second security control unit. Consequently, in a preferred embodiment the second control unit is adapted to provide a performance environment being higher as compared to the first control unit. In addition, in a possible embodiment of the present disclosure the first control unit is a secure processor, comprises a secure element and/or comprises a secure block adapted to provide a secure processing environment.

In comparison to prior art, the present disclosure allows for an adaptation of the fingerprint authentication process where a main (the first in accordance to the definition of the present disclosure) fingerprint template for the user's finger never leaves the secure processing environment provided by the first control unit. Accordingly, there will not be possible for e.g. a third party to influence the comparison between an acquired fingerprint image and the main/first fingerprint template since no external access is allowed to the main/first fingerprint template. Rather, the less secure second control unit in a first implementation of the present disclosure only used for determining a (second) set of elements indicative of the fingerprint from the acquired fingerprint image.

The determination of the second set of elements may be allowed to be in comparison "computationally heavy" as compared to what may be performed by the first control unit in determining the first set of elements from the acquired fingerprint image, since the second control unit (as mentioned above) in a typical embodiment is adapted to provide a performance environment being higher as compared to what is provided by the first control unit.

In line with the present disclosure, the authentication of the user is thus performed by the first control unit, based on the first/main fingerprint template in combination with the first and the second set elements determined from the acquired fingerprint image, possibly including a matching between the first set of elements and the first fingerprint template. Thus, not only is the main/first fingerprint template not "allowed to leave" the secure processing environment provided by the first control unit, the second set of elements determined using the second control unit may be "double checked" against the first set of elements determined using the secure first control unit. In an embodiment a first memory element is associated with the first control unit, where the first memory element is adapted for storing the first fingerprint template.

Accordingly, by means of the present disclosure it is possible to allow advanced authentication processes with high computational requirements to be implemented while still ensuring the authentication process to have, in comparison to prior art, high security and less risk of a successful hacker attack. In addition to the above, it should of course be understood that the general segmentation of the authentication process may be highly useful also in implementations of electronic devices where the capability secure process is limited due to cost and/or real estate reasons, such as for example in relation to a smartcard implementation.

Within the context of the present disclosure, the expressions "representation of a fingerprint pattern of a finger of the user" or "fingerprint image" should be interpreted broadly and to include both a regular "visual image" of a fingerprint of a finger as well as a set of measurements relating to the finger when acquired using the fingerprint sensor. A plurality of fingerprint representations/images may be subsequently acquired and fused together, where the resulting information is used as an input for determining the sets of features.

Likewise, the expression "control unit" should be understood to include any type of computing device, such as an ASIC, a micro-processor, etc. It should also be understood that the actual implementation of such a control unit may be divided between more than a single element/device/circuit, collectively still referred to as a control unit. Preferably, the second control unit is arranged separately from the first control unit.

The fingerprint sensor may be implemented using any kind of current or future fingerprint sensing principle, including for example capacitive, optical, or thermal sensing technology, as well as a combination thereof. Both one and two-dimensional sensors are possible and within the scope of the present disclosure.

In case the user is successfully authenticated, it may in accordance to the present disclosure be possible to perform at least one action. Such an action may for example be for the electronic device for allowing the user to perform further operations using the electronic device, such as when the electronic device is a mobile phone or a tablet. The at least one action may of course be any type of action suitably used when there is a need to authenticate a finger, such as allowing a financial transaction to be proceeded, in case the electronic device e.g. is a smartcard. In case of a successful authentication, it may also be possible to update at least the first fingerprint template based on at least one of the first set of determined elements and the second set of determined elements.

In one exemplary embodiment of the present disclosure, the first control unit is connected to and configured to control the operation of the fingerprint sensor. Such an implementation may for example be useful in relation to situation where the electronic device is the mentioned mobile phone/tablet, laptop, etc. In an alternative exemplary embodiment the second control unit is connected to and configured to control the operation of the fingerprint sensor. Correspondingly, such an implementation may for example be useful in relation to a smartcard implementation, etc. Depending on the selected implementation, the fingerprint representation may be "passed by" or "transmitted through" the control unit adapted to control the operation of the fingerprint sensor. The transmission of any data between the first and the second control unit may in some embodiments include encryption/decryption of the data prior/subsequent to transmitting/receiving the data.

In some embodiments of the present disclosure it may be possible to further include authenticating, at the second control unit, the user based on a second fingerprint template representative for the finger of the user and the first and the second set of elements, possibly including a matching between the second set of elements and the second fingerprint template. Such an embodiment may in some implementations allow for an even further security of the electronic device. However, it is desirable to allow the second fingerprint template to be completely separate from the main/first fingerprint template, since the second fingerprint template will be provided in relation to the less secure second control unit. In a similar manner as discussed above, it may be possible to include a second memory element associated with the second control unit, where the second memory element is adapted for storing the second fingerprint template.

In a possible embodiment of the present disclosure the method comprises matching, at the first control unit, the first set of determined elements with the first fingerprint template, and matching, at the second control unit, the second set of determined elements with a second fingerprint template representative for the finger of the user, wherein the step of authenticating the user further comprises the steps of comparing, at the first control unit, a result of the matching at the second control unit and a result of the matching at the first control unit, and authenticating, at the first control unit, the user only if a result of the comparison indicates that the matching at the first control unit corresponds to the matching at the second control unit. Accordingly, two separate and possibly non-related matching processes may be performed;

where after the result of the matching processes are compared, thereby allowing for additional security in the authentication process.

Based on the fact that the first control unit is somewhat "weaker" form a computational perspective in comparison to the second control unit, it may in some embodiments be advantageous to determine the first set of elements from a sub-section of the fingerprint representation. A sub-section may in accordance to the present disclosure be seen as comprising e.g. cropping, decimation or truncation process for reducing the amount of data that is to be processed. Accordingly, a reduced amount of information is thus processed for the determination of the first set of elements, thereby possibly balancing the computational capability of the first control unit.

In an embodiment, it may also be possible to allow the process performed at the second control unit to form/generate helper/assistance data that to be provided to the first control unit. The helper/assistance data may subsequently be used for assisting the first control unit with the process performed by the first control unit, e.g. including the matching process performed by the first control unit, allowing for the processing performed by the first control unit to be performed with less computational complexity. The helper/assistance data may for example comprise fingerprint feature transformation information, etc. generated during the matching process performed at the second control unit.

In a possible embodiment, the sub-section of the fingerprint representation is selected by the first control unit. Such an implementation will again disallow any third party in being involved with what information is selected further use in comparison with the main/first fingerprint template. It may be preferred to allow this selection to be at least partly random, or at least to be different for different fingerprint representations (such as different for consecutive authentications of the finger of the user).

According to another aspect of the present disclosure, there is provided an electronic device, comprising a fingerprint sensor configured for capturing a fingerprint representation of a fingerprint pattern of a finger of the user, a first control unit adapted to provide a processing environment having a first security level, and a second control unit adapted to provide a processing environment having a second security level, wherein the first security level is higher than the second security level and the electronic device is adapted to acquire a fingerprint representation using the fingerprint sensor, provide the fingerprint representation to the first control unit, provide the fingerprint representation to the second control unit, determine, using the first control unit, a first set of elements indicative of the fingerprint based on the fingerprint representation, determine, using the second control unit, a second set of elements indicative of the fingerprint based on the fingerprint representation, provide information relating to the second set of elements to the first control unit, and authenticate, at the first control unit, the user based on a first fingerprint template representative for the finger of the user, the first set of elements and the information relating to the second set of elements. This aspect of the present disclosure provides similar advantages as discussed above in relation to the previous aspect of the present disclosure.

According to a further aspect of the present disclosure, there is provided a computer program product comprising a computer readable medium having stored thereon computer program means for controlling an electronic device, the electronic device comprising a fingerprint sensor configured for capturing a fingerprint representation of a fingerprint pattern of a finger of the user, a first control unit adapted to provide a processing environment having a first security level, and a second control unit adapted to provide a processing environment having a second security level, wherein the first security level is higher than the second security level and the computer program product comprises code for acquiring a fingerprint representation using the fingerprint sensor, code for providing the fingerprint representation to the first control unit, code for providing the fingerprint representation to the second control unit, code for determining, using the first control unit, a first set of elements indicative of the fingerprint based on the fingerprint representation, code for determining, using the second control unit, a second set of elements indicative of the fingerprint based on the fingerprint representation, code for providing information relating to the second set of elements to the first control unit, and code for authenticating, at the first control unit, the user based on a first fingerprint template representative for the finger of the user, the first set of elements and the information relating to the second set of elements. Also this aspect of the present disclosure provides similar advantages as discussed above in relation to the previous aspects of the present disclosure.

In summary, the present disclosure generally relates to a method for authenticating a user using an electronic device, where the electronic device comprises a fingerprint sensor as well as a first and a second control unit. At least one of the first and the second control unit comprises a secure element and/or a secure block adapted to provide a secure processing environment. Advantages of the present disclosure include the possibility of allowing advanced authentication processes with high computational requirements to be implemented while still ensuring the authentication process to have, in comparison to prior art, high security and less risk of a successful hacker attack.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1A:
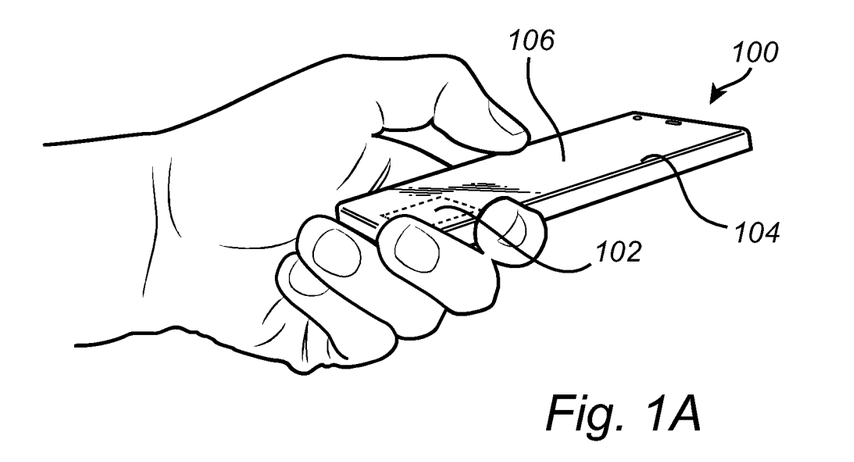
FIGS. 1A and 1B schematically exemplify different electronic devices according to the present disclosure, in the form of a mobile phone and a smartcard comprising an integrated fingerprint sensor.

Turning now to the drawings and to FIG. 1A in particular, there is schematically illustrated a first example of an electronic device according to the present disclosure, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the present disclosure may be applicable in relation to any other type of portable electronic device, such as a laptop, a remote control, a tablet computer, or any other type of present or future similarly configured device.

Figure 1B:
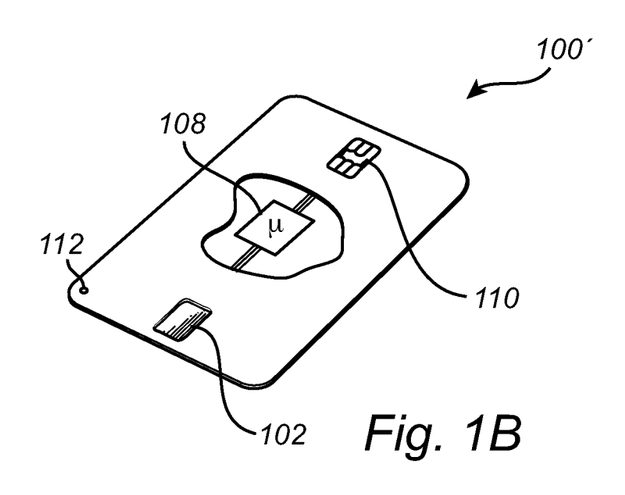

In FIG. 1B there is illustrated a second example of an electronic device according to the present disclosure, in the form of a smartcard 100', integrating a fingerprint sensing system including e.g. a corresponding fingerprint sensor 102 including a plurality of sensing elements and configured for capturing a fingerprint representation of a fingerprint pattern of a finger of a user, as well as at least one control unit arrangement 108 connected to and configured to control the operation of the fingerprint sensor 102. In this embodiment the fingerprint sensor 102 is arranged on the front side of the smart card 100'. However, the fingerprint sensor 102 may as an alternative (or also) be provided on a back side of the smart card 100'. The fingerprint sensor 102 may, for example, be used for authenticating the user when performing a payment/transaction, for example allowing the smart card 100', once the finger of the user has been enrolled, to interact with e.g. a POS terminal. Furthermore, the smart card 100' may integrate a plurality of contact pads 110 electrically connected to at least the control unit 108, possibly allowing for providing a wired connection with the POS terminal if/when the smart card 100' is inserted in a card slot provided with the POS terminal 302.

In addition, the smart card 100' may in some embodiments also include a user interface, such as for example a light source 112 (e.g. a light emitting diode, LED) integrated with the smart card carrier 100 and arranged in electrical connection with control unit 108. Still further, the smart card 100' preferably comprises means (not shown) for allowing wireless interaction with the POS terminal, such as adapted for allowing near field communication (NFC) between the smart card 100' and the POS terminal. Accordingly, in using wireless communication the user need not insert the smart card 100' into the card slot of the POS terminal. The NFC connection between the smart card 100' and the POS terminal may further be used for providing electrical power to the smart card 100', in a manner known to the skilled person.

The control unit arrangement 108 is preferably arranged in communication with or comprises a memory, such as a database, e.g. for storing one or a plurality of fingerprint template for one or a plurality of fingers for the user. The control unit arrangement 108 may include microprocessors, microcontrollers, programmable digital signal processors or other programmable devices. The control unit arrangement 108 may also, or instead, each include application specific integrated circuits, programmable gate arrays or programmable array logic, programmable logic devices, or digital signal processors.

Where the control unit arrangement 108 includes programmable devices such as microprocessors, microcontrollers or programmable digital signal processors as mentioned above, the processors may further include computer executable code that controls operation of the programmable devices. It should be understood that all or some parts of the functionality provided by means of the control unit arrangement 108 (or generally discussed as "processing circuitry") may be at least partly integrated with the fingerprint sensor 102. In relation to the present disclosure, the processing performed by the control unit arrangement 108 is partly split between at least a first 108A and a second 108B control unit as will be further elaborated below in relation to FIGS. 3A-3C.

Figure 2:
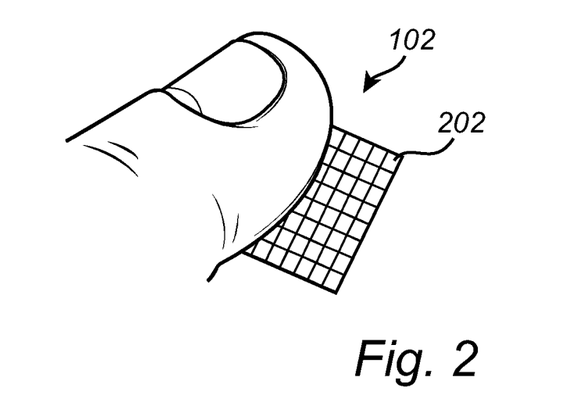
FIG. 2 schematically shows the fingerprint sensor array comprised in the electronic device in FIG. 1.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202. It should however, as indicated above, be understood that the present disclosure may be applicable also to other types of fingerprint sensing technologies, such as optical, or thermal sensing technology, as well as a combination thereof. Both one and two-dimensional sensors are possible and within the scope of the present disclosure.

Figure 3A:
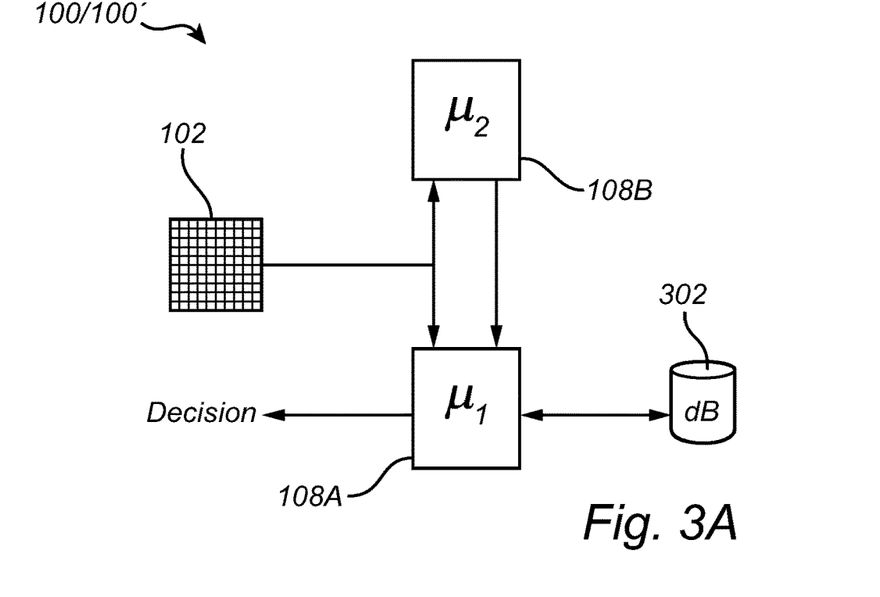
FIGS. 3A-3C conceptually illustrates different implementations of electronic devices according to currently preferred embodiment of the present disclosure.
Figure 4:
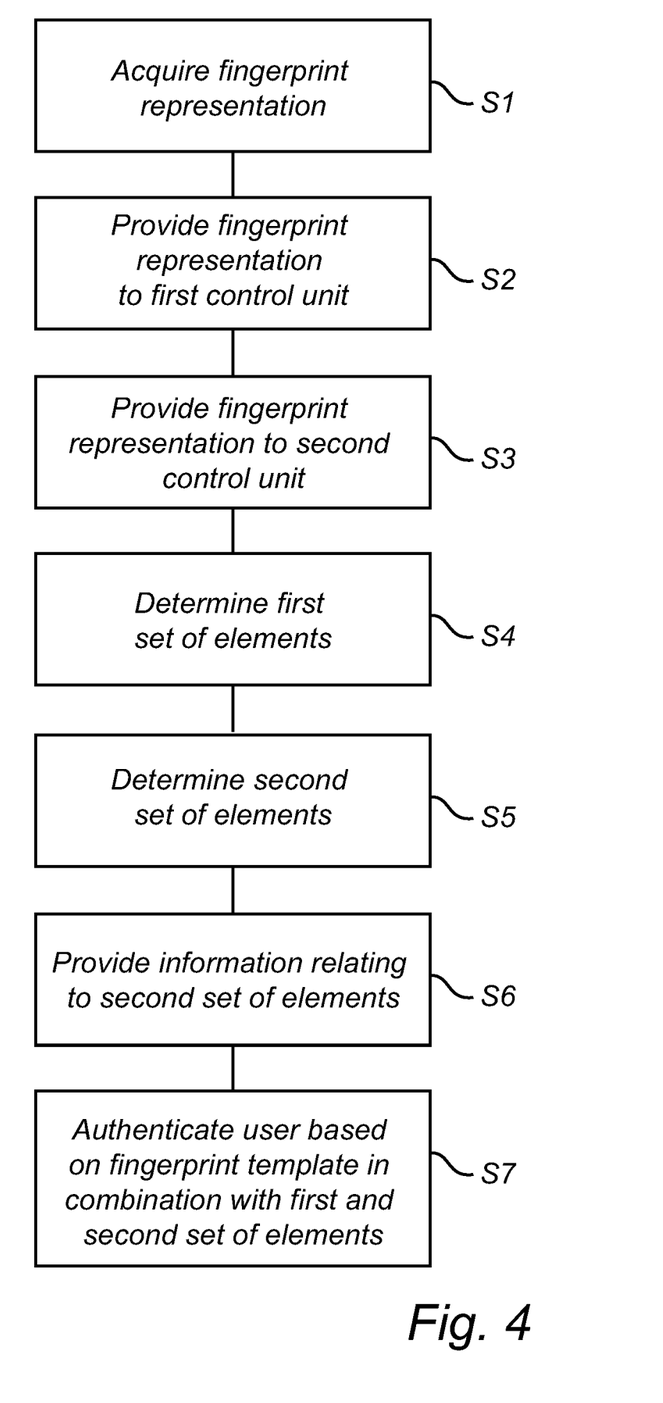
FIG. 4 is a flowchart disclosing the exemplary steps of the present disclosure typically performed in conjunction with any of the electronic devices FIGS. 3A and 3B.

Turning now to FIG. 3A in conjunction with FIG. 4, there is conceptually illustrated a generalized possible implementation of the concept provided in accordance to the present disclosure. The example shown in FIG. 3A may generally be applicable to both of the examples of electronic devices 100, 100' as shown in FIGS. 1A and 1B, e.g. applicable to both the mobile phone and the smart card examples.

As was indicated above, the control unit arrangement 108 provided with the electronic device 100, 100' comprises a first 108A and a second 108B control unit. The first control unit 108A is configured to have a security level that is higher than a security level provided by the second control unit 108B. As mentioned above, the first control unit 108A is preferably a secure processor, comprises a secure element and/or comprises a secure block adapted to provide a secure processing environment. It should further be understood that the communication between the first and the second control unit 108A, 108B in some embodiments may be encrypted.

In the example provided in FIG. 3A, the fingerprint sensor 102 is communicatively coupled to the first 108A as well as second 108B control unit, allowing a fingerprint representation of a finger of the user to be acquired, S1, by the fingerprint sensor 102 and then provided, S2/S3, to the first 108A and the second 108B control unit. It should be understood that it is not always necessary to provide a "full" fingerprint representation (such as a full fingerprint image) to each of the first 108A and the second 108B control units. Rather, e.g. either of the first 108A and the second 108B may be "in charge" of operating the fingerprint sensor, whereby the fingerprint representation in one embodiment may be received at the first control unit 108A and the "forwarded" to the second control unit 108B, possibly in a somewhat adjusted form such as possibly a bit truncated or similar, as exemplified above.

Once the fingerprint representation has been provided to each of the first 108A and the second 108B control units, each of the control units 108A/108B will determine, S4/S5 a respective first and second set of elements indicative of the fingerprint based on the fingerprint representation. The second control unit 108B will then provide, S6, information relating to the second set of elements to the first control unit 108A.

Finally, the user will be authenticated, S7, within the secure environment of the first control unit 108A based on the first set of elements, the information relating to the second set of elements (e.g. information based on the second set of elements), and a first fingerprint template representative for the finger of the user. The fingerprint template may typically be stored within a database 302 comprised with the electronic device 100/100'.

Figure 3B:
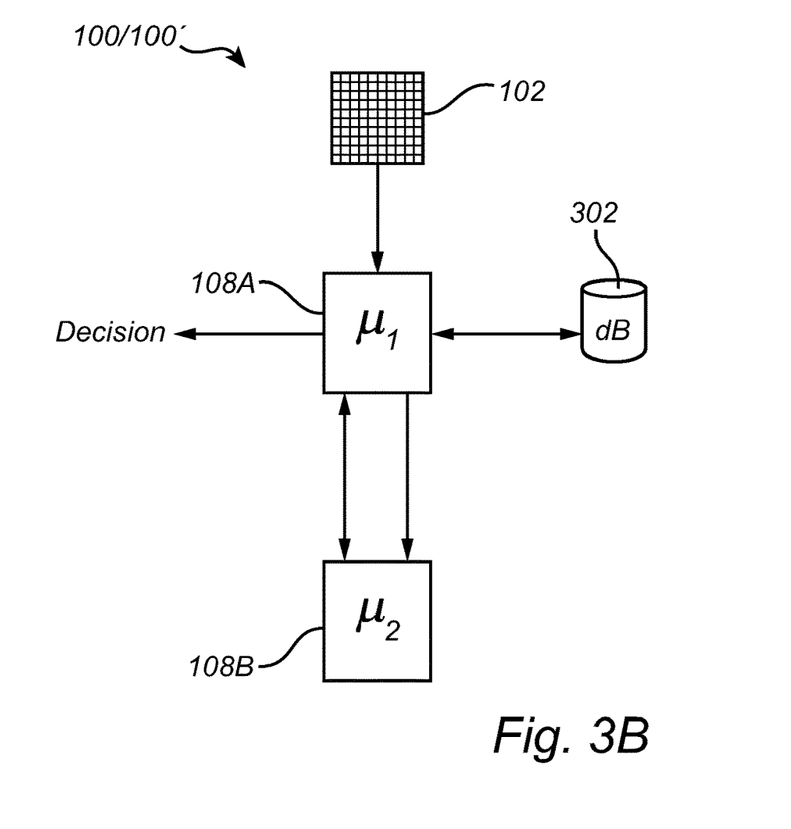
Figure 3C:
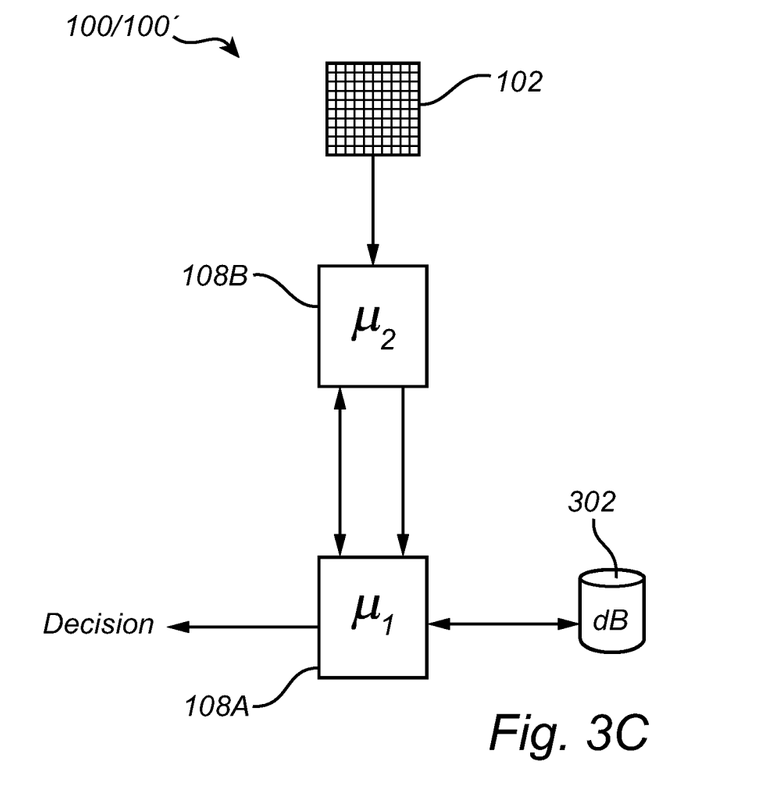

FIGS. 3B and 3C conceptually illustrates alternative implementations of electronic devices 100/100' according to currently preferred embodiment of the present disclosure. Specifically, in FIG. 3B the first control unit 108A is connected to and configured to control the operation of the fingerprint sensor 102, whereas in FIG. 3C the second control unit 108B is connected to and configured to control the operation of the fingerprint sensor 102.

In all of the embodiments shown in FIGS. 3A-3C, at least a portion of the processing for forming information to be used in authenticating the user is performed in each of the first and the second control unit 108A, 108B. However, in all of the embodiments it is the first control unit 108A providing the more secure processing environment that performs the final step of authentication of the user, based on information formed in each of the first and the second control unit 108A, 108B. Accordingly, the algorithms used for forming the information to be used for authenticating the user may be subdivided into different portions, where e.g. the second control unit 108B typically providing higher computing performance as compared to the first control unit 108A and thus may be adapted to perform a more complex portion of the formation of the information to be used in authenticating the user.

In a possible implementation in line with the present disclosure, the portion of the authentication process performed by the first control unit 108A comprises verifying the information formed at the second control unit 108B. That is, the first control unit 108A may for example be adapted to only determine the first set of elements from a smaller portion of the acquired fingerprint representation as compared to what is determined at the second control unit 108B, e.g. at specific possibly randomly selected locations within the fingerprint representation (fingerprint image). Consequently, the authentication step will in such an embodiment comprise matching the first and the second set of elements with the intention that the first set of elements should be "found" as a sub-portion of the second set of elements. If the first set of elements is considered to be essentially found within the second set of elements, the second set of elements may then be used in comparison with the fingerprint template. Alternatively, only some of the elements are detected/determined by both of the first and the second control unit 108, 108B. Those overlapping elements may then be used in comparison with the template. Such elements may possibly be included in a possible template matching procedure.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:
1. A method of authenticating a user using an electronic device, the electronic device comprising:
 a fingerprint sensor configured for capturing a fingerprint representation of a fingerprint pattern of a finger of the user,
 a first control unit adapted to provide a first processing environment having a first security level, wherein the first control unit is a secure processor comprising at least one of a secure element and a secure block, and a second control unit adapted to provide a second processing environment having a second security level, wherein the first security level is higher than the second security level, wherein the second processing environment provides a computationally greater processing environment as compared to the first processing environment, wherein the method comprises:

acquiring a fingerprint representation using the fingerprint sensor, providing the fingerprint representation to the first control unit, providing the fingerprint representation to the second control unit, determining, using the first control unit, a first set of elements indicative of the fingerprint based on the fingerprint representation, wherein the first set of elements is determined from a sub-section of the fingerprint representation, matching, at the first control unit, the first set of elements with a first fingerprint template representative for the finger of the user, determining, using the second control unit, a second set of elements indicative of the fingerprint based on the fingerprint representation, matching, at the second control unit, the second set of elements with a second fingerprint template representative for the finger of the user, the second fingerprint template being different than the first fingerprint template, providing information relating to the second set of elements to the first control unit, comparing, at the first control unit, a result of the matching at the second control unit and a result of the matching at the first control unit, and authenticating, at the first control unit, the user based on the first fingerprint template, the first set of elements and the information relating to the second set of elements, wherein the user is only authenticated when a result of the comparison indicates that the matching at the first control unit corresponds to the matching at the second control unit.

2. The method according to claim 1, wherein the second control unit is connected to and configured to control the operation of the fingerprint sensor.

3. The method according to claim 1, wherein the method further comprises:

authenticating, at the second control unit, the user based on the second fingerprint template representative for the finger of the user and the first and the second set of elements.

4. The method according to claim 1, wherein the second control unit is arranged separately from the first control unit.

5. The method according to claim 1, wherein the electronic device further comprises a second memory element associated with the second control unit for storing the second fingerprint template.

6. The method according to claim 1, wherein the sub-section of the fingerprint representation is selected by the first control unit.

7. The method according to claim 1, wherein comparing the result of the matching at the first control unit and the result of the matching at the second control unit comprises:

comparing the first set of elements with the second set of elements, or comparing a sub-portion of the first set of elements with the second set of elements.

8. The method according to claim 1, further comprising:

encrypting, at the second control unit, the information relating to the second set of elements prior to providing the information relating to the second set of elements to the first control unit, and decrypting, at the first control unit, the encrypted information relating to the second set of elements.

9. The method according to claim 1, further comprising, following a successful authentication of the user:

updating the first fingerprint template based on at least one of the first set of determined elements and the second set of determined elements, and/or updating the second fingerprint template based on the second set of determined elements.

10. The method according to claim 1, wherein the first control unit is connected to and configured to control the operation of the fingerprint sensor.

11. The method according to claim 10, wherein the step of providing the fingerprint representation to the second control unit comprises transmitting the fingerprint representation from the first control unit to the second control unit.

12. The method according to claim 11, further comprising:

encrypting, at the first control unit, the fingerprint representation prior to transmitting the fingerprint representation to the second control unit, and decrypting, at the second control unit, the encrypted fingerprint representation.

13. An electronic device, comprising:

a fingerprint sensor configured for capturing a fingerprint representation of a fingerprint pattern of a finger of the user, a first control unit adapted to provide a first processing environment having a first security level, wherein the first control unit is a secure processor comprising at least one of a secure element and a secure block, and a second control unit adapted to provide a second processing environment having a second security level, wherein the first security level is higher than the second security level, wherein the second processing environment provides a computationally greater processing environment as compared to the first processing environment, wherein the electronic device is adapted to:

acquire a fingerprint representation using the fingerprint sensor, provide the fingerprint representation to the first control unit, provide the fingerprint representation to the second control unit, determine, using the first control unit, a first set of elements indicative of the fingerprint based on the fingerprint representation, wherein the first set of elements is determined from a sub-section of the fingerprint representation, match, at the first control unit, the first set of elements with a first fingerprint template representative for the finger of the user, determine, using the second control unit, a second set of elements indicative of the fingerprint based on the fingerprint representation, match, at the second control unit, the second set of elements with a second fingerprint template representative for the finger of the user, the second fingerprint template being different than the first fingerprint template, provide information relating to the second set of elements to the first control unit, compare, at the first control unit, a result of the matching at the second control unit and a result of the matching at the first control unit, and authenticate, at the first control unit, the user based on the first fingerprint template, the first set of elements and the information relating to the second set of elements, wherein the user is only authenticated when a result of the comparison indicates that the matching at the first control unit corresponds to the matching at the second control unit.

14. A computer program product comprising a non-transitory computer readable medium having stored thereon a computer program for controlling an electronic device, the electronic device comprising:

a fingerprint sensor configured for capturing a fingerprint representation of a fingerprint pattern of a finger of the user, a first control unit adapted to provide a first processing environment having a first security level, wherein the first control unit is a secure processor comprising at least one of a secure element and a secure block, and a second control unit adapted to provide a second processing environment having a second security level, wherein the first security level is higher than the second security level, wherein the second processing environment provides a computationally greater processing environment as compared to the first processing environment, wherein the computer program product comprises:

code for acquiring a fingerprint representation using the fingerprint sensor, code for providing the fingerprint representation to the first control unit, code for providing the fingerprint representation to the second control unit, code for determining, using the first control unit, a first set of elements indicative of the fingerprint based on the fingerprint representation, wherein the first set of elements is determined from a sub-section of the fingerprint representation, code for matching, at the first control unit, the first set of elements with a first fingerprint template representative for the finger of the user, code for determining, using the second control unit, a second set of elements indicative of the fingerprint based on the fingerprint representation, code for matching, at the second control unit, the second set of elements with a second fingerprint template representative for the finger of the user, the second fingerprint template being different than the first fingerprint template, code for providing information relating to the second set of elements to the first control unit, code for comparing, at the first control unit, a result of the matching at the second control unit and a result of the matching at the first control unit, and code for authenticating, at the first control unit, the user based on the first fingerprint template, the first set of elements and the information relating to the second set of elements, wherein the user is only authenticated when a result of the comparison indicates that the matching at the first control unit corresponds to the matching at the second control unit.

\* \* \* \* \*